US008190916B1

(12) United States Patent
Wang et al.

(10) Patent No.: US 8,190,916 B1
(45) Date of Patent: May 29, 2012

(54) METHODS AND SYSTEMS FOR MODIFYING AN INTEGRITY MEASUREMENT BASED ON USER AUTHENTICATION

(75) Inventors: Lan Wang, Houston, TX (US); Valiuddin Y. Ali, Houston, TX (US); Jennifer E. Rios, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1415 days.

(21) Appl. No.: 11/493,973

(22) Filed: Jul. 27, 2006

(51) Int. Cl.
*G06F 21/00* (2006.01)
(52) U.S. Cl. ...................................................... 713/193
(58) Field of Classification Search ................... 713/193
See application file for complete search history.

(56) References Cited

U.S. PATENT DOCUMENTS

| | | | | | |
|---|---|---|---|---|---|
| 5,537,544 | A | * | 7/1996 | Morisawa et al. | 726/19 |
| 6,012,146 | A | * | 1/2000 | Liebenow | 726/17 |
| 6,125,457 | A | * | 9/2000 | Crisan et al. | 714/36 |
| 6,157,722 | A | * | 12/2000 | Lerner et al. | 380/260 |
| 7,330,977 | B2 | * | 2/2008 | Cromer et al. | 713/189 |
| 2003/0037231 | A1 | * | 2/2003 | Goodman et al. | 713/2 |
| 2003/0120918 | A1 | * | 6/2003 | VanDer Kamp | 713/164 |
| 2004/0268135 | A1 | * | 12/2004 | Zimmer et al. | 713/189 |
| 2005/0144443 | A1 | * | 6/2005 | Cromer et al. | 713/165 |
| 2005/0250473 | A1 | * | 11/2005 | Brown et al. | 455/411 |
| 2006/0064752 | A1 | | 3/2006 | Wang et al. | |
| 2006/0112420 | A1 | * | 5/2006 | Challener et al. | 726/5 |
| 2006/0155988 | A1 | * | 7/2006 | Hunter et al. | 713/164 |
| 2006/0161790 | A1 | | 7/2006 | Hunter et al. | |
| 2007/0101156 | A1 | * | 5/2007 | Novoa et al. | 713/190 |

FOREIGN PATENT DOCUMENTS

| | | |
|---|---|---|
| CN | 1728104 | 2/2006 |
| EP | 1679632 | 7/2006 |
| JP | 2004-265286 | 9/2004 |
| JP | 2006-023943 | 1/2006 |

OTHER PUBLICATIONS

Trusted Computing Platform Alliance: "TCG PC Specific Implementation Specification."
Trusted Computing Platform Alliance: TCG PC Specific Implementation Specification, ver. 1.0, Sep. 9, 200; Internet Citation: URL:https://www.trustedcomputinggroup.org.
International Application No. PCT/US2007/016411 form PCT/ISA/220 & PCT/ISA/210 Mailed Feb. 26, 2008.
English Translation of State Intellectual Property Office, P.R. China, Decision on Rejection, Appln. No. 200780036165.2, date mailed Jan. 19, 2011, pp. 9.
State Intellectual Property Office, P.R. China, Decision on Rejection, Appln. No. 200780036165.2 date mailed Jan. 19, 2011, pp. 7.
European Patent Office, Communication pursuant to Article 94(3) EPC, Appln. No. 07836160.7, date of mailing Sep. 28, 2011, 7 p.
JP Notice of Rejection, Appln. No. P2009-521773, date of mailing Sep. 7, 2011, 3 p.
Translation of JP Notice of Rejection, Appln. No. P2009-521773, date of mailing Sep. 7, 2011, 4 p.

* cited by examiner

*Primary Examiner* — Michael S McNally (57) ABSTRACT

A computer system is provided that comprises a processor and a Basic Input/Output System (BIOS) accessible to the processor. During a boot process, the BIOS determines an integrity measurement for the computer system and modifies the integrity measurement based on a user authentication.

17 Claims, 4 Drawing Sheets

METHODS AND SYSTEMS FOR MODIFYING AN INTEGRITY MEASUREMENT BASED ON USER AUTHENTICATION

BACKGROUND

Many authentication strategies limit the number of separate user identities or secrets that can be authenticated. For example, some drive lock mechanisms only support authentication of a single password. To authenticate a drive lock password, a Basic Input/Output System (BIOS) requests that a user enter a password during a pre-boot environment and provides the value entered by the user to the hard drive. If the password is correct, the hard drive will start spinning (i.e., the drive is "unlocked"). If the password is incorrect, the drive will not spin (i.e., the drive is "locked"). This pre-boot authentication feature is somewhat incompatible in a multi-user environment (e.g., a workplace). While a common password could be shared by multiple users (enabling any of multiple users to be authenticated using the same password), security and user-friendliness are better served using individualized passwords. Furthermore, other authentication processes (e.g., smartcard or biometric processes) may be associated with individual users rather than groups. Thus, an authentication strategy that involves authenticating a single secret or a limited number of secrets becomes incompatible, or at least inconvenient, in a multi-user environment where authenticating many user identities or secrets is desirable.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Many authentication strategies limit the number of separate user identities or secrets that can be authenticated. Embodiments of the invention support authenticating any of multiple user identities or secrets as a prerequisite to accessing a secure device (or privilege) that, without an embodiment of the invention, only supports authentication of a single secret or a limited set of secrets (i.e., the number of potential users that will access the secure device is greater than the number of secrets that can be authenticated for or by the secure device).

In at least some embodiments, a computing platform's Basic Input/Output System (BIOS) acts as a trusted agent between multiple users and the secure device. In other words, the BIOS controls the secret that unlocks the secure device or privilege. During a boot process, the BIOS can authenticate any of the multiple users based on individual passwords, smartcards, biometrics or some other authentication process. If user authentication is successful, the BIOS securely accesses the secret associated with the secure device. In some embodiments, the BIOS retrieves the secret from a Trusted Platform Module (TPM) which is able to seal and unseal the secret. Once received, the BIOS uses the secret to unlock the secure device or to access a privilege. As an example, the secure device may be a disk drive protected by a drive lock mechanism. Additionally or alternatively, the BIOS may use the secret to access a secure privilege such as decryption of encrypted data.

Figure 1:
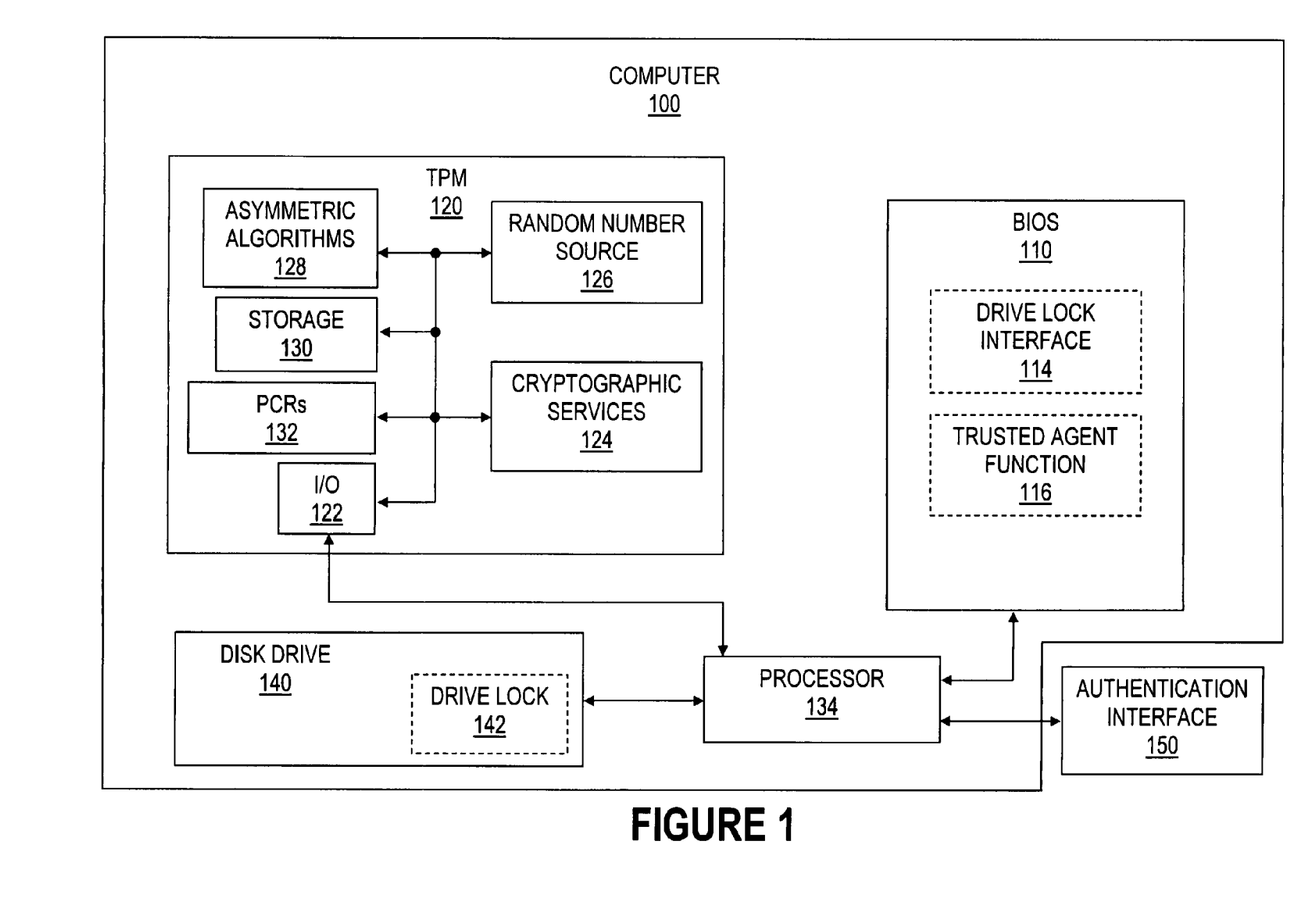
FIG. 1 shows a computer in accordance with embodiments of the invention.

FIG. 1 shows a computer 100 in accordance with embodiments of the invention. The computer 100 may be, for example, a server, a desktop computer, a laptop computer or a handheld device. In some embodiments, the computer 100 comprises a processor 134 coupled to a Trusted Platform Module (TPM) 120 and a disk drive 140 having a drive lock function 142. As shown, the processor 134 has access to a Basic Input/Output System (BIOS) 110 which may be implemented, for example, as part of a chipset (e.g., a "Southbridge") or other non-transitory computer readable storage medium. The processor 134 also couples to an authentication interface 150 that enables a user to input data to the computer 100 for user authentication. The authentication interface 150 could be, for example, a keyboard, a mouse, a virtual token (e.g., a Universal Serial Bus (USB) token) source, a smartcard reader, a biometric scanner, or some other interface that receives data for user authentications.

The TPM 120 is configured to provide cryptographic functions such as an RSA asymmetric algorithm for digital signature and for encryption, SHA-1 hashing, a Hash-based Message Authentication Code (HMAC) function, secure storage, random number generation, or other functions The TPM 120 is implemented using software, firmware and/or hardware. The TPM components shown in FIGS. 1 and 2 have been generalized and are not all-inclusive. Also, TPM architectures and functions may possibly change over time as authorized by the Trusted Computing Group (TCG).

As shown in FIG. 1, the TPM 120 comprises an input/output (I/O) interface 122 in communication with the processor 134. The I/O interface 122 couples to other TPM components such as cryptographic services 124, a random number source 126, asymmetric algorithms 128, storage 130 and Platform Configuration Registers (PCRs) 132. The cryptographic services 124 support functions such as hashing, digital signing, encryption and decryption. The random number source 126 generates random numbers for the cryptographic services 124. For example, in some embodiments, the cryptographic services 124 use random numbers to generate encryption keys. The asymmetric algorithms 128 enable the TPM 120 to perform asymmetric key operations. The storage 130 securely stores secrets (e.g., encryption keys or other data) protected by the TPM 120. The PCRs 132 store information about the current state of the computer 100. For example, in some embodiments, the PCRs 132 store individual integrity measurements related to the computer 100 as well as sequences of integrity measurements. As will later be described, the integrity measurements stored in at least one of the PCRs 132 can be verified as a prerequisite to providing a secret associated with the drive lock function 142 to the BIOS 110.

As shown in FIG. 1, the BIOS 110 comprises a drive lock interface 114 and a trusted agent function 116. For convenience in describing embodiments of the invention, the terms "initialization stage" and "verification stage" will be used. In the initialization stage, a secret is securely stored such that the secret can only be accessed if certain conditions are satisfied. In the verification stage, a determination is made as to whether the conditions have been satisfied. If the conditions have been satisfied, the secret becomes accessible to the BIOS 110. Otherwise, the secret remains securely stored and inaccessible. As described herein, both the drive lock interface 114 and the trusted agent function 116 perform certain functions in the initialization stage and the verification stage.

During the initialization stage, the drive lock interface 114 enables an administrator or other authorized entity to enter a secret to be used with the drive lock function 142 of the disk drive 140 (i.e., the secret can be used to lock and/or unlock the disk drive 140). Alternatively, the drive lock interface 114 causes the BIOS 110 to generate the secret without user input. In either case, the trusted agent function 116 causes the secret to be securely stored such that the secret can only be accessed if certain conditions are met. In at least some embodiments, the trusted agent function 116 causes the secret to be sealed by the TPM 120 such that only the TPM 120 can unseal the secret.

To seal the secret, the TPM 120 inserts the secret into a data structure (sometimes referred to as a "blob"). In at least some embodiments, the format of the blob is defined by the TCG. Portions of the blob (such as the area containing the secret) are encrypted by the TPM 120. The blob also may include a PCR value that has been "extended" based on boot operations or integrity measurements performed by the BIOS 110. Some examples of values that the BIOS 110 can extend to a given PCR 132 include, but are not limited to, a Power-On Self-Test (POST) start value, platform specific values, a successful user authentication value, a failed user authentication value, a POST exit value (i.e., integrity measurements of the platform's hardware, firmware, or software), or other values. In at least some embodiments, the PCR value that is sealed with the secret has been extended based on a POST start value, platform specific values and a successful user authentication value. Using the cryptographic services 124, the TPM 120 seals the blob containing the secret and the PCR value such that only the TPM 120 can unseal the blob. In at least some embodiments, the TPM 120 verifies that current PCR values match the PCR values specified in the blob before releasing the secret to the BIOS 110. If the TPM 120 is involved with user authentication as may be the case in some embodiments, a user password (or other identifier) can also be inserted in the blob and sealed by the TPM 120. In such case, the TPM 120 could verify this password before releasing the secret to the BIOS 110.

During the verification stage (e.g., during a subsequent boot), the BIOS 110 again performs boot operations or integrity measurements of the computer 100. These integrity measurements can be stored, for example, in at least one of the PCRs 132. At some point during the verification stage, the trusted agent function 116 performs authentication of any of multiple users that access the computer 100. The user authentication can be based on passwords, smartcards, biometrics or any other authentication process supported by the authentication interface 150 and the BIOS 110. The TPM 120 may or may not be involved with user authentication, although the TPM 120 selectively unseals the secret based, in part, on successful user authentication. If the TPM 120 is involved with user authentication, the user can be authenticated by entering the password that was sealed with the secret as previously mentioned.

If the user is successfully authenticated (regardless of whether the TPM 120 is involved or not), the trusted agent function 116 causes the BIOS 110 to modify an integrity measurement of the computer 100. For example, the BIOS 110 could modify an integrity measurement by extending a successful user authentication value to a given PCR 132. In at least some embodiments, the given PCR 132 would already have had a POST start value and platform specific values of the computer 100 extended to it. Alternatively, the values (measurements) could be extended to the given PCR 132 in a different order (e.g., the successful user authentication value could be extended to the given PCR 132 before the platform specific values of the computer 100 are extended to the given PCR 132). The order and the number of values that are extended to the given PCR 132 can vary as long as the same process is used during the initialization stage and the verification stage. In other words, one purpose of the verification stage is to selectively generate the same PCR value that was generated and sealed in the initialization stage. In at least some embodiments, the PCR value that was generated in the initialization stage is generated in the verification stage only if the user authentication is successful and certain platform specific measurements of the computer 100 have not changed.

If desired, the order and number of values that are extended to the given PCR 132 during the initialization stage and the verification stage can be updated. Such an update could occur routinely to increase security of the initialization stage and the verification stage and/or could occur if a need arises to update the hardware, firmware, or software of the computer 100.

If the user is not successfully authenticated, the trusted agent function 116 causes the BIOS 110 to modify an integrity measurement of the computer 100 such that the modified integrity measurement based on the failed user authentication is different than the modified integrity measurement based on the successful user authentication. For example, the BIOS 110 could modify an integrity measurement by extending a failed user authentication value to a given PCR 132. In at least some embodiments, the given PCR 132 would already have had a POST start value and platform specific values extended to it. As previously mentioned, the order and the number of values that are extended to the given PCR 132 can vary as long as the same process is used during the initialization stage and the verification stage.

After the integrity measurement has been modified based on a successful or failed user authentication, the trusted agent function 116 requests access to the secret that has been securely stored. The secret is released to the trusted agent function 116 if the modified integrity measurement equals a predetermined value that corresponds, in part, to a successful user authentication. In some embodiments, the TPM 120 releases the secret to the trusted agent function 116 if a PCR value generated during the verification stage matches a PCR value that was generated during the initialization stage and sealed with the secret.

If the user authentication fails, the PCR value that was generated in the initialization stage is not generated in the verification stage. Additionally or alternatively, if certain platform specific measurements of the computer 100 have changed, the PCR value that was generated in the initialization stage is not generated in the verification stage. At least the PCR value that was generated in the initialization stage would not be generated at the time the PCR values are compared in the verification stage. On the other hand, if the user authentication is successful and certain platform specific measurements of the computer 100 have not changed, the PCR value that was generated in the initialization stage is generated in the verification stage such that successful comparison of the PCR values occurs.

Upon successful comparison of the modified integrity measurement with the predetermined integrity measurement, the BIOS 110 receives the secret. For example, in some embodiments, upon successful comparison of a PCR value generated during the verification stage with a PCR value that was generated during the initialization stage and sealed with the secret, the BIOS 110 receives the secret from the TPM 120. The drive lock interface 114 can then use the secret to unlock the drive lock function 142 of the disk drive 140. If the comparison fails, the secret is not provided to the BIOS 110 and the disk drive 140 remains locked.

Figure 2:
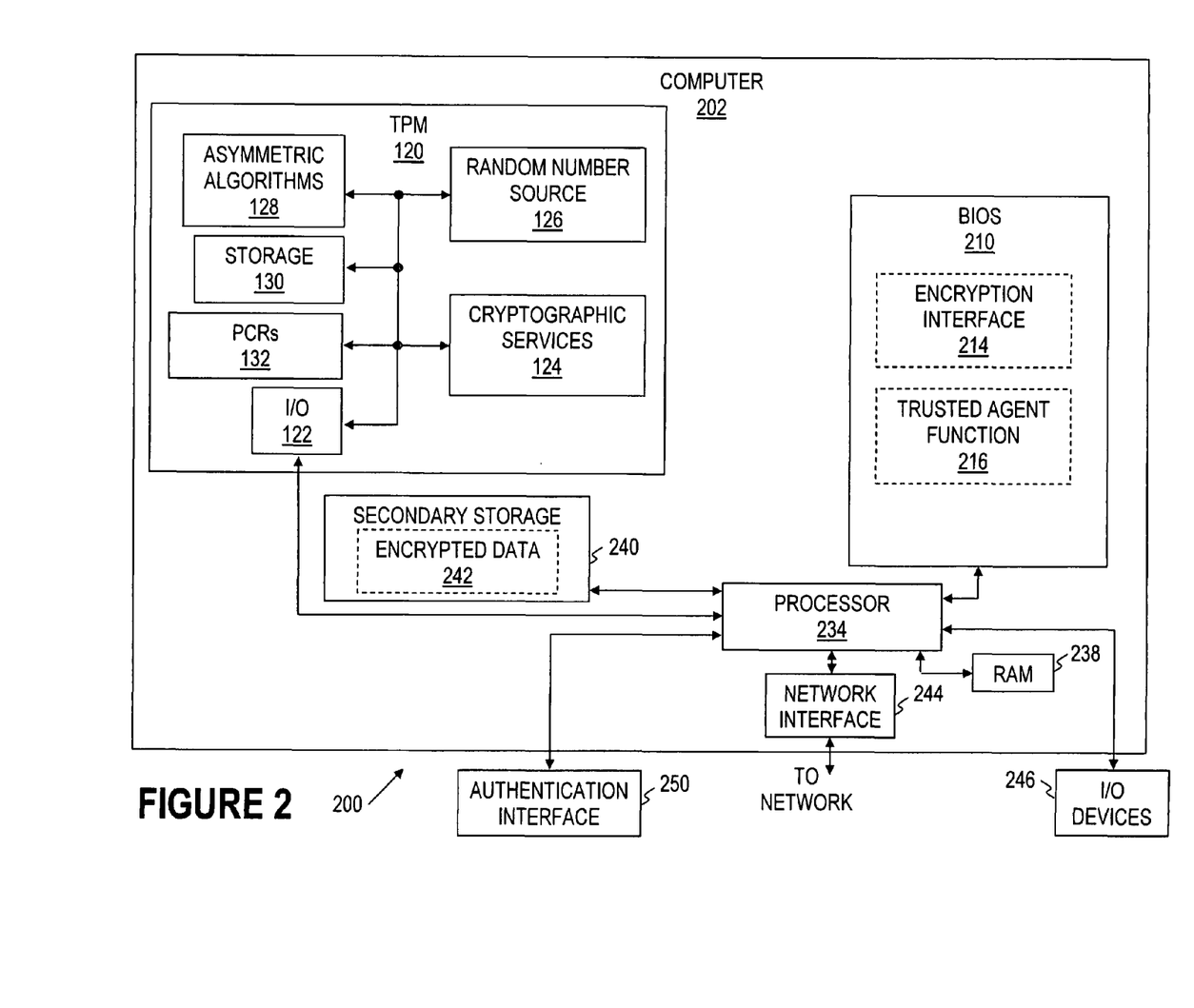
FIG. 2 shows a system in accordance with embodiments of the invention.

FIG. 2 shows a system 200 in accordance with embodiments of the invention. As shown in FIG. 2, the system 200 comprises a computer 202 having a processor 234 coupled to a Trusted Platform Module (TPM) 120. The functions of the TPM 120 were previously described for FIG. 1 and, for convenience, will not be repeated for FIG. 2. However, it should be understood that while the TPM functions previously described have not changed, the manner in which the TPM 120 is used in FIG. 2 could be different from the manner in which the TPM 120 is used in FIG. 1. Also, if the computer 100 of FIG. 1 and the computer 202 of FIG. 2 are separate computers, each would implement a separate TPM 120.

As shown in FIG. 2, the processor 234 has access to a BIOS 210 which may be implemented, for example, as part of a chipset (e.g., a "Southbridge") or other non-transitory computer readable storage medium. The BIOS 210 is similar to the BIOS 110 of FIG. 1 with the exception that the BIOS 210 comprises an encryption interface 214 rather than a drive lock interface 114 as in FIG. 1. In alternative embodiments, the BIOS 210 may comprise both a drive lock interface 114 as in FIG. 1 and an encryption interface 214 as in FIG. 2.

As shown in FIG. 2, the processor 234 also couples to other components such as a secondary storage 240, random access memory (RAM) 238, a network interface 244, an authentication interface 250 and input/output (I/O) devices 246. As an example, the I/O devices 246 could be printers, scanners, video monitors, liquid crystal displays (LCDs), touch screen displays, keyboards, keypads, switches, dials, mice, track balls, voice recognizers, card readers, paper tape readers, or other I/O devices.

In at least some embodiments, the secondary storage 240 comprises at least one disk drive or tape drive that stores encrypted data 242. The encrypted data 242 may be part or all of the data stored by the secondary storage 240 and only an appropriate encryption key can be used to decrypt the encrypted data 242. The secondary storage 240 is used for non-volatile storage of data and as an over-flow data storage device if the RAM 238 is not large enough to hold all working data. Also, the secondary storage 240 may be used to store programs which are loaded into the RAM 238 when such programs are selected for execution. The RAM 238 may store volatile data and/or instructions.

In FIG. 2, the processor 234 executes instructions, codes, computer programs, or scripts which are accessed from hard disks, floppy disks, optical disks (these various disk based systems may all be considered secondary storage 240), RAM 238, or the network interface 244. In order for the processor 234 to access or execute the encrypted data 242 stored on the secondary storage 240, decryption of the encrypted data 242 is necessary. This decryption involves the BIOS 210 gaining access to an encryption key that is securely stored as will later be described.

The network interface 244 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, or other network interfaces. Via the network interface 244, the processor 234 is able to connect to and communicate with the Internet or intranet(s). With such a network connection, it is contemplated that the processor 234 might receive information from the network, or might output information to the network in the course of performing user authentications or accessing an encryption key which is securely stored by the computer 202. For example, if the computer 202 is booted from a remote location, as may be the case in some embodiments, at least some functions performed by the encryption interface 214 and the trusted agent function 216 could be controlled remotely rather than locally. If a TPM is used to securely store the encryption key, the same TPM that seals the encryption key would unseal the encryption key.

For convenience in describing embodiments of the invention, the terms "initialization stage" and "verification stage" will again be used. In the initialization stage, an encryption key is securely stored such that the encryption key can only be accessed if certain conditions are satisfied. In the verification stage, a determination is made as to whether the conditions have been satisfied. If the conditions have been satisfied, the encryption key is accessible to the BIOS 210. Otherwise, the encryption key remains securely stored and inaccessible. As described herein, both the encryption interface 214 and the trusted agent function 216 perform certain functions in the initialization stage and the verification stage.

During the initialization stage, the encryption interface 214 enables an administrator or other authorized entity to enter an encryption key that is used to encrypt data (e.g., data of the secondary storage 240). Alternatively, the encryption interface 214 could cause the BIOS 210 to generate the encryption key without user input. In either case, the trusted agent function 216 causes the encryption key to be securely stored such that the encryption key can only be accessed if certain conditions are met. In at least some embodiments, the trusted agent function 216 causes the encryption key to be sealed by the TPM 120 such that only the TPM 120 can unseal the encryption key.

To seal the encryption key, the TPM 120 inserts the encryption key into data structure referred to as a "blob" of data. As previously mentioned, in some embodiments, the format of the blob is defined by the TCG. Portions of the blob (such as the area containing the encryption key) are encrypted by the TPM 120. The blob also may include a PCR value that has been "extended" based on boot operations or integrity measurements performed by the BIOS 210 for the computer 202. Some examples of values that the BIOS 210 can extend to a given PCR 132 include, but are not limited to, a Power-On Self-Test (POST) start value, platform specific values (i.e., integrity measurements of the platform's hardware, firmware, or software), a successful user authentication value, a failed user authentication value, a POST exit value, or other values. In at least some embodiments, the PCR value that is sealed with the encryption key has been extended based on a POST start value, platform specific values and a successful user authentication value. Using the cryptographic services 124, the TPM 120 seals the blob containing the encryption key and the PCR value such that only the TPM 120 can unseal the blob. In at least some embodiments, the TPM 120 verifies that current PCR values match the PCR values specified in the blob before releasing the encryption key to the BIOS 210. If the TPM 120 is involved with user authentication as may be the case in some embodiments, a user password (or other identifier) can also be inserted in the blob and sealed by the TPM 120. In such case, the TPM 120 could verify the user password before releasing the encryption key to the BIOS 210.

During the verification stage (e.g., during a subsequent boot), the BIOS 210 again performs boot operations or integrity measurements of the computer 202. These integrity measurements can be stored, for example, in at least one of the PCRs 132. At some point during the verification stage, the trusted agent function 216 performs authentication of any of multiple users that access the computer 202. The user authentication can be based on passwords, smartcards, biometrics or some other authentication process supported by the authentication interface 250 and the BIOS 210. The TPM 120 may or may not be involved with user authentication, although the TPM 120 will later unseal the encryption key based, in part, on successful user authentication. If the TPM 120 is involved with user authentication, the user can be authenticated by entering the password that was sealed with the encryption key as previously mentioned.

If the user is successfully authenticated (regardless of whether the TPM 120 is involved or not), the trusted agent function 216 causes the BIOS 210 to modify an integrity measurement of the computer 202. For example, the BIOS 210 could modify an integrity measurement by extending a successful user authentication value to a given PCR 132. In at least some embodiments, the given PCR 132 would already have had a POST start value and platform specific values of the computer 202 extended to it. Alternatively, the values (measurements) could be extended to the given PCR 132 in a different order (e.g., the successful user authentication value could be extended to the given PCR 132 before the platform specific values of the computer 202 are extended to the given PCR 132). The order and the number of values that are extended to the given PCR 132 can vary as long as the same process is used during the initialization stage and the verification stage. In other words, one purpose of the verification stage is to selectively generate the same PCR value that was generated and sealed in the initialization stage. In at least some embodiments, the PCR value that was generated in the initialization stage is generated in the verification stage if the user authentication is successful and the certain platform specific measurements of the computer 202 have not changed. Examples of platform specific measurements include but are not limited to the BIOS version, the actual BIOS code, device configuration values, and a hard drive identifier.

If desired, the order and number of values that are extended to the given PCR 132 during the initialization stage and the verification stage can be updated. Such an update could occur routinely to increase security of the initialization stage and the verification stage and/or could occur if a need arises to update the hardware, firmware, or software of the computer 202.

If the user is not successfully authenticated, the trusted agent function 216 causes the BIOS 210 to modify an integrity measurement of the computer 202 such that the modified integrity measurement based on the failed user authentication is different than the modified integrity measurement based on the successful user authentication. For example, the BIOS 210 could modify an integrity measurement by extending a failed user authentication value to a given PCR 132. In at least some embodiments, the given PCR 132 would already have had a POST start value and platform specific values extended to it. As previously mentioned, the order and the number of values that are extended to the given PCR 132 can vary as long as the same process is used during the initialization stage and the verification stage.

After the integrity measurement has been modified based on a successful or failed user authentication, the trusted agent function 216 requests access to the encryption key that has been securely stored. The encryption key is released to the trusted agent function 216 if the modified integrity measurement equals a predetermined value that corresponds, in part, to a successful user authentication. In some embodiments, the TPM 120 releases the encryption key to the trusted agent function 216 if a PCR value generated during the verification stage matches a PCR value that was generated during the initialization stage and sealed with the encryption key.

If the user authentication fails, the PCR value that was generated in the initialization stage is not generated in the verification stage. Additionally or alternatively, if certain platform specific measurements of the computer 202 have changed, the PCR value that was generated in the initialization stage is not generated in the verification stage. At least the PCR value that was generated in the initialization stage would not be generated at the time the PCR values are compared in the verification stage. On the other hand, if the user authentication is successful and certain platform specific measurements of the computer 202 have not changed, the PCR value that was generated in the initialization stage is generated in the verification stage such that successful comparison of the PCR values occurs.

Upon successful comparison of the modified integrity measurement with the predetermined integrity measurement, the BIOS 210 receives the encryption key. For example, in some embodiments, upon successful comparison of a PCR value generated during the verification stage with a PCR value that was generated during the initialization stage and sealed with the encryption key, the BIOS 210 receives the encryption key from the TPM 120. The encryption interface 114 can then use the encryption key to decrypt the encrypted data 242. Alternately, the BIOS 210 can pass the encryption key to some other secure interface (e.g., another encryption interface) which performs the decryption of the data. If the comparison of PCR values fails, the encryption key is not provided to the BIOS 210. In such case, the encrypted data 242 cannot be decrypted.

Figure 3:
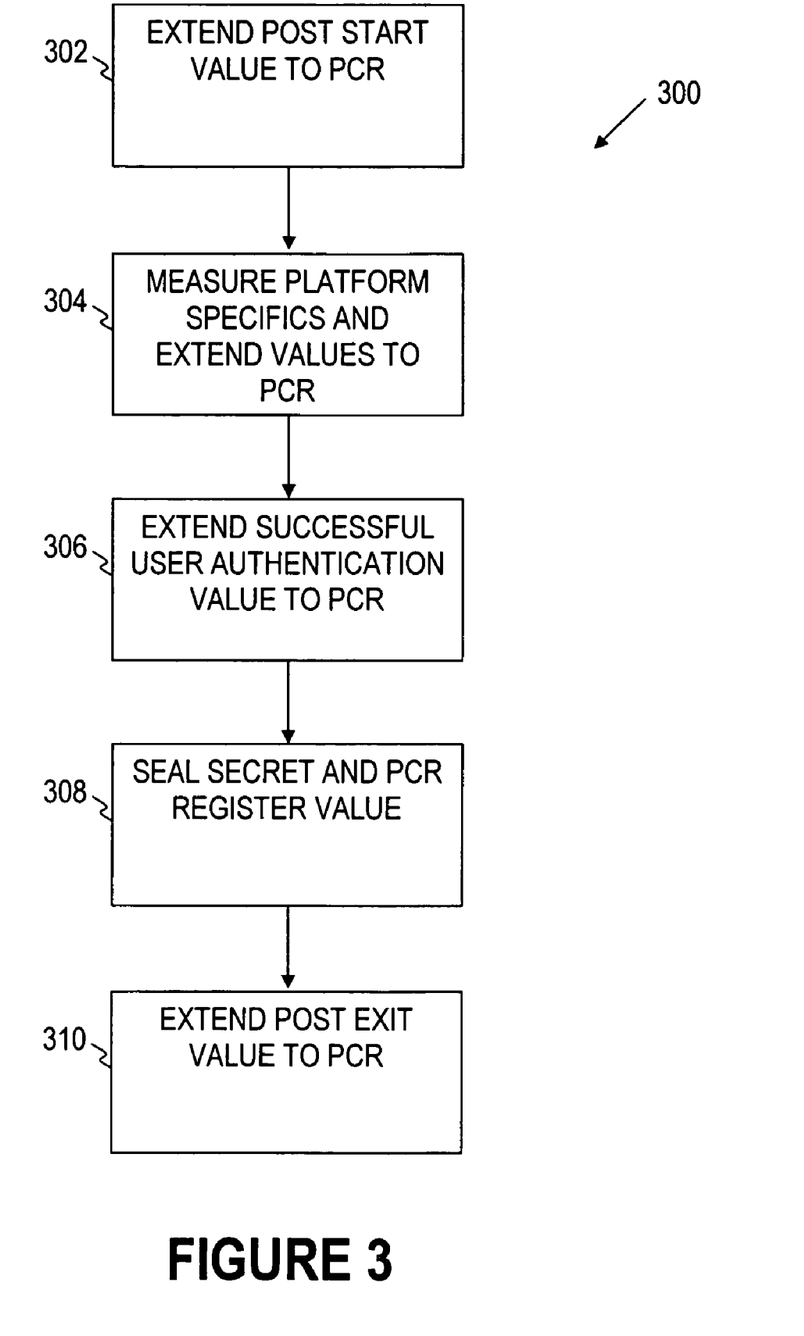
FIG. 3 illustrates a method in accordance with embodiments of the invention.

FIG. 3 illustrates a method 300 in accordance with embodiments of the invention. In at least some embodiments, the method 300 corresponds to the initialization stage previously described. As shown in FIG. 3, the method 300 comprises extending a POST start value to a PCR (block 302). At block 304, platform specifics are measured and corresponding values are extended to the PCR. At block 306, a successful user authentication value is extended to the PCR. A secret and the PCR value are then sealed (block 308). The secret can be used, for example, to unlock a drive lock function or to decrypt encrypted data. Finally, a POST exit value is extended to the PCR (block 310). By extending the POST exit value to the PCR, the previous PCR value that was sealed with the secret cannot be ascertained (i.e., each extend operation changes the PCR value in a way that prevents any of the previous PCR values from being ascertained). The method 300 can be performed, for example, during a boot process using a BIOS in communication with a TPM.

Figure 4:
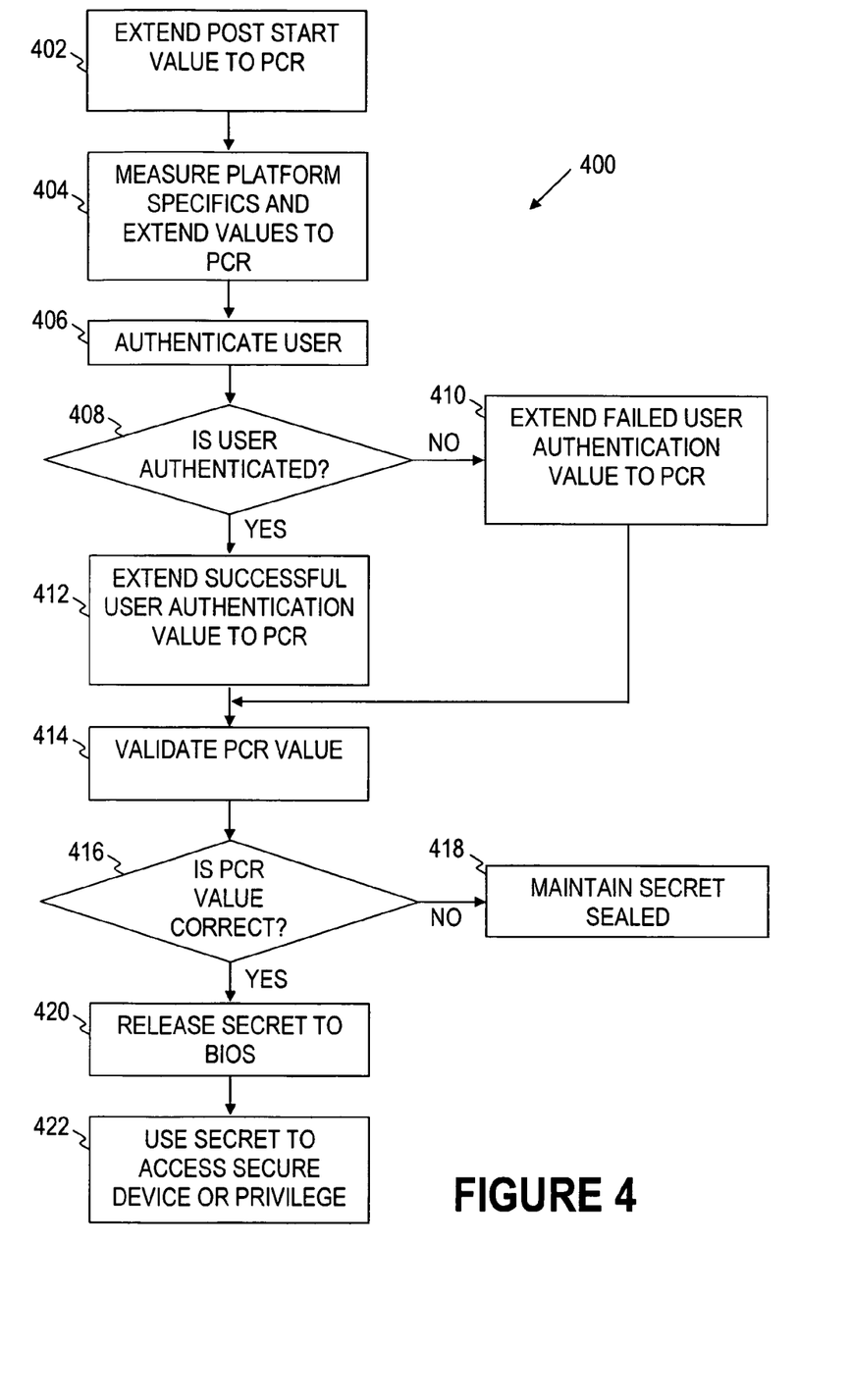
FIG. 4 illustrates another method in accordance with embodiments of the invention.

FIG. 4 illustrates another method 400 in accordance with embodiments of the invention. In at least some embodiments, the method 400 corresponds to the verification stage previously described. As shown in FIG. 4, the method 400 comprises extending a POST start value to a PCR (block 402). At block 404, platform specifics are measured and corresponding values are extended to the PCR. At block 406, any of multiple users are authenticated. The user authentication occurs during a computing platform's boot process and may be based on passwords, smartcards, biometrics or another authentication process or combination of authentication processes.

If a user is not authenticated (determination block 408), a failed user authentication value is extended to the PCR (block 410). Alternatively, if the user is authenticated (determination block 408), a successful user authentication value is extended to the PCR (block 412). The PCR value is then validated (block 414). If the PCR value is incorrect (determination block 416) (i.e., the current PCR value does not match the PCR value that was sealed with the secret), the secret stays sealed (block 418). Alternatively, if the PCR value is correct (determination block 416) (i.e., the current PCR value matches the PCR value that was sealed with the secret), the secret is released to the computing platform's BIOS (block 420). Finally, the secret is used to access a secure device or privilege (block 422). For example, the secret may enable the BIOS to unlock a disk drive or to decrypt data.

What is claimed is:

1. A computer system, comprising:
 a processor; and
 a Basic Input/Output System (BIOS) accessible to the processor;
 wherein, during a first boot process, a first integrity measurement is determined for the computer system and a secret is sealed with the first integrity measurement, the first integrity measurement being based on hardware configuration values of the computer system,
 wherein, during a subsequent boot process, the secret is unsealed for use by the BIOS if a second integrity measurement determined for the computer system matches the first integrity measurement and a user authentication is successful; and
 wherein, as a result of the second integrity measurement, a configuration register is extended to include a Power-On Self-Test (POST) start or exit value, a measurement of a hardware parameter of the computer system, and a successful or failed user authentication value.

2. The computer system of claim 1 wherein, during the first boot process, the first integrity measurement is modified by a successful user authentication value and wherein, during the subsequent boot process, the second integrity measurement is modified by either the successful user authentication value or an unsuccessful user authentication value.

3. The computer system of claim 2 wherein, during the subsequent boot process, the modified first integrity measurement is compared with the modified second integrity measurement and, if the second modified integrity measurement matches the first modified integrity measurement, the BIOS receives access to the secret.

4. The computer system of claim 1 further comprising a locking storage device coupled to the processor, wherein the BIOS uses the secret to unlock the locking storage device.

5. The computer system of claim 1 further comprising a storage device coupled to the processor, wherein the storage device stores encrypted data and wherein the BIOS decrypts the encrypted data based on the secret.

6. The computer system of claim 1 further comprising a Trusted Platform Module (TPM) coupled to the processor, wherein the TPM seals the secret with the first integrity measurement and wherein the TPM does not unseal the secret unless the first integrity measurement matches the second integrity measurement.

7. The computer system of claim 1 wherein the BIOS supports user authentication data received from different authentication interfaces coupled to the processor, the authentication interfaces being selected from the group consisting of a keyboard, a mouse, a virtual token source, a smartcard reader and a biometric scanner.

8. The computer system of claim 1 wherein the user authentication is based on the BIOS authenticating any of a plurality of different secrets associated with a plurality of users that access the computer system.

9. The computer system of claim 1 further comprising a network interface coupled to the processor, wherein the network interface enables the computer system to be rebooted from a remote location and wherein the user authentication involves transmitting data from the remote location.

10. A method, comprising:
 securely sealing, during a boot process, a secret with a first integrity measurement of a computer system, the first integrity measurement being based on hardware configuration values of the computer system;
 generating, during a subsequent boot process, a second integrity measurement for the computer system; and
 if the first integrity measurement matches the second integrity measurement and a user authentication is successful, then unsealing the secret;
 wherein generating the second integrity measurement comprises extending a Power-On Self-Test (POST) start or exit value to a Platform Configuration Register (PCR); measuring hardware parameters of the computer system and extending corresponding values to the PCR, and extending a successful user authentication value or a failed user authentication value to the PCR.

11. The method of claim 10 further comprising unlocking a storage device based on the secret.

12. The method of claim 10 further comprising decrypting data based on the secret.

13. The method of claim 10 further comprising sealing the secret and the first integrity measurement using a Trusted Platform Module (TPM).

14. A non-transitory computer-readable storage medium that stores Basic Input/Output System (BIOS) instructions executable by a processor, the BIOS instructions comprising:
 a trusted agent function that, when executed during a boot cycle, seals a secret with an initialization mode integrity measurement for a computing platform, the initialization mode integrity measurement being based on hardware configuration values for the computer system;

wherein the trusted agent function, when executed during a subsequent boot cycle, determines a verification mode integrity measurement for the computing platform and unseals the secret if the verification mode integrity measurement matches the initialization mode measurement and if a user authentication is successful;

wherein the trusted agent function extends, to a configuration register, a Power-On Self-Test (POST) start or exit value, a value corresponding to a measurement of a hardware parameter of the computing platform, and a successful or failed user authentication value.

15. The non-transitory computer-readable storage medium of claim 14 wherein the trusted agent function, when executed, determines the initialization mode integrity measurement by extending hardware configuration values to a Platform Configuration Register (PCR).

16. The non-transitory computer-readable storage medium of claim 15 wherein the trusted agent function, when executed, further determines the initialization mode integrity measurement by extending a successful user authentication value to the PCR.

17. The non-transitory computer-readable storage medium of claim 14 wherein the trusted agent function, when executed, determines the verification mode integrity measurement by extending hardware configuration values to a Platform Configuration Register (PCR) and by extending a successful user authentication value or a failed user authentication value to the PCR.

* * * * *